United States Patent
Pantos

(10) Patent No.: US 10,284,888 B2
(45) Date of Patent: May 7, 2019

(54) MULTIPLE LIVE HLS STREAMS

(71) Applicant: Apple Inc., Cupertino, CA (US)

(72) Inventor: Roger N. Pantos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/613,173

(22) Filed: Jun. 3, 2017

(65) Prior Publication Data
US 2018/0352274 A1    Dec. 6, 2018

(51) Int. Cl.
*H04N 7/173* (2011.01)
*H04N 21/242* (2011.01)
*H04N 21/2187* (2011.01)

(52) U.S. Cl.
CPC ....... *H04N 21/242* (2013.01); *H04N 21/2187* (2013.01)

(58) Field of Classification Search
CPC ........... H04N 21/812; H04N 21/47202; H04N 21/6125; H04N 21/235; H04N 21/435; H04N 21/4331; H04N 7/17318; H04N 7/17336; H04N 7/165; H04N 7/173
USPC .............. 725/91–93, 114–116; 709/217–232
See application file for complete search history.

(56) References Cited

U.S. PATENT DOCUMENTS

| | | | | |
|---|---|---|---|---|
| 5,668,948 A * | 9/1997 | Belknap | ................ | H04H 20/42 348/552 |
| 8,280,863 B2 * | 10/2012 | Pantos | ............... | H04N 7/17318 707/693 |
| 8,532,171 B1 * | 9/2013 | Narayanan | ......... | H04N 21/8451 375/240.01 |
| 8,560,642 B2 * | 10/2013 | Pantos | ................ | H04L 65/1083 709/217 |
| 8,832,295 B2 * | 9/2014 | Zuckerman | ......... | H04L 67/1008 709/231 |
| 8,935,432 B1 * | 1/2015 | McGowan | ............ | H04L 65/605 709/248 |
| 9,813,325 B2 * | 11/2017 | Syed | ....................... | H04L 43/50 |
| 2003/0021346 A1 * | 1/2003 | Bixby | .............. | H04N 21/23424 375/240.25 |
| 2011/0080940 A1 * | 4/2011 | Bocharov | .......... | H04N 21/4331 375/240.01 |
| 2011/0238789 A1 * | 9/2011 | Luby | ................ | H04N 21/23106 709/219 |
| 2015/0341812 A1 * | 11/2015 | Dion | ..................... | H04W 24/08 370/252 |
| 2016/0006946 A1 * | 1/2016 | Cohen | ................... | G06F 19/326 348/660 |
| 2016/0345074 A1 * | 11/2016 | Serbest | ................. | H04N 21/812 |
| 2016/0353177 A1 * | 12/2016 | Gordon | ................ | H04N 21/482 |
| 2018/0007395 A1 * | 1/2018 | Ugur | ................ | H04N 21/21805 |

(Continued)

*Primary Examiner* — Annan Q Shang
(74) *Attorney, Agent, or Firm* — BakerHostetler LLP

(57) ABSTRACT

Techniques for synchronizing playback of multiple media streams are presented, including where presentation timestamps in the multiple media streams may not related. Techniques include determining a first correspondence between the first encoding timestamp and the first presentation time; determining a second correspondence between the second encoding timestamp and the second presentation time; and synchronizing a first player for the first stream and a second player for the second stream based on the first correspondence, the second correspondence, the first and second encoding timestamp, and a playback clock available to both first and second players.

21 Claims, 6 Drawing Sheets

(56) References Cited

U.S. PATENT DOCUMENTS

2018/0063590 A1* 3/2018 Her .................. H04N 21/47217
2018/0302452 A1* 10/2018 Pantos ................ H04L 65/1083

* cited by examiner

100

200

300

600

700

US 10,284,888 B2

MULTIPLE LIVE HLS STREAMS

BACKGROUND

Media, including audio and/or video, can be captured, encoded, and streamed live over a computer network using a protocol such as HTTP live streaming (HLS). The HLS protocol includes a manifest containing pointers (or references) to separate segments of video data. A single live media stream may include multiple tracks that can be synchronized with each other via presentation time stamps (PTSes) embedded in the segments of audio or video data.

A typical media player will time playback based on a local player clock. In the case of playback of a live stream, where a player may not have control over the rate at which the media stream is received at the player, playback rate based on a local player clock may be adjusted in response to buffer fullness measurements of the received live stream.

Many types of modern events include multiple cameras and/or microphones for capturing the event simultaneously from different angles or positions at the event. Separate HLS media encoders may not, however, generate PTSes that correlate to each other.

DETAILED DESCRIPTION

Many types of events, such as sporting events, benefit from multiple cameras simultaneously capturing different camera angles or different locations of a single event. In such situations, it can be useful to be able to identify which images from the multiple cameras are captured at the same time. In one such situation, multiple cameras may simultaneously capture and encode video using separate capture clocks to generate encoded presentation time stamps (PTSes). The encoded video stream may be streamed live to players over a computer network, for example using HTTP live streaming (HLS). However, synchronizing playback of separately encoded and streamed HLS streams is problematic because the PTSes in each stream may not directly correspond, for example because the PTSes of different streams were generated using separate capture clocks at separate encoders. This disclosure presents techniques for synchronizing playback of streamed video, including playback of multiple HLS live media streams.

Techniques include receiving a plurality of media streams, where each stream includes segments of media having presentation time stamps (PTSes) measured in that stream's presentation time, and includes a manifest with encoding time stamps (ETSes). PTSes in different streams may be derived from separate capture clocks and the PTSes in different streams may not directly correspond. ETSes in different streams may directly correspond and may be derived from the same clock, such as a wall clock measured in Greenwich Mean Time. For each stream, a correspondence may be determined between the encoding timestamps of that stream and presentation timestamps (or the presentation time) of that same stream. Playback may then be synchronized between players for each media stream based on the encoding timestamps, the PTS-ETS correspondences, and a playback clock. For example, the players may be synchronized by setting an anchor time for each player based on the PTS-ETS correspondence of a player's stream, the correspondence of the PTS to a system clock, and a start time for that stream measured in the presentation time of that stream.

In some embodiments, where a media stream includes some media segments without a corresponding ETS in a manifest, an ETS for such segments can be estimated and corrected. An ETS may be estimated for a segment based on an ETS for another segment in the same stream, and duration for intervening segments. An estimated ETS for a segment can be corrected based on PTSes in that segment.

Figure 1:
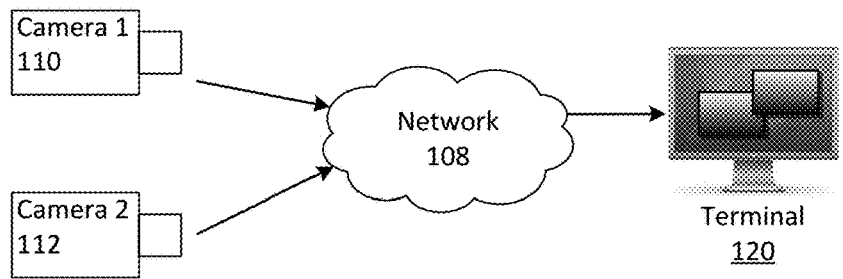
FIG. 1 is a simplified block diagram of an example video delivery system.

FIG. 1 is a simplified block diagram of an example video delivery system 100. The system 100 may include a plurality of cameras 110, 112 connected to a terminal 120 via a network 108. The cameras 110, 112 may code video data for transmission to terminal 120 via network 108. Thus, a first camera 110 may capture video data locally, code the video data, and transmit the coded video data to terminal 120 via a channel in network 108. Separately, a second camera 112 may capture video data locally, code the video data, and transmit the coded video data to terminal 120 via a separate channel in network 108. The receiving terminal 120 may receive the coded video data from cameras 110 and 112, decode it, and render it locally, for example, on a display at the terminal 120. In some embodiments, the coded video data received from camera 110 will be rendered simultaneously and in sync with the coded video data received from camera 112.

A video delivery system 100 may be used in a variety of applications. In a first application, the terminal 120 may support real time transmission of coded video simultaneously from camera 110 and camera 112. In another application, cameras 110 and 120 may code pre-produced video (for example, television or movie programming) and store the coded video for delivery to one or, often, many downloading clients (e.g., terminal 120). Thus, the video being coded may be live or pre-produced, and the cameras 110, 112 may act as media servers, delivering the coded video according to a one-to-one or a one-to-many distribution model. For the purposes of the present discussion, the type of video, and the video distribution schemes are immaterial unless otherwise noted.

In FIG. 1, the cameras 110, 112 and terminal 120 are illustrated as cameras and a computer, respectively, but the principles of the present disclosure are not so limited. Embodiments of the present disclosure also find application with phones, computers (both desktop and laptop computers), computer servers, media players, dedicated video conferencing equipment, and/or dedicated video encoding equipment. Embodiments may be performed by instructions stored in memory and executed on computer processors, and may also be performed by special-purpose hardware.

The network represents any number of networks that convey coded video data between the cameras 110, 112 and terminal 120, including, for example, wireline and/or wireless communication networks. The communication network may exchange data in circuit-switched or packet-switched channels. Representative networks include telecommunications, local area networks, wide area networks, and/or the Internet. For the purposes of the present discussion, the architecture and topology of the network are immaterial to the operation of the present disclosure unless otherwise noted.

Figure 2:
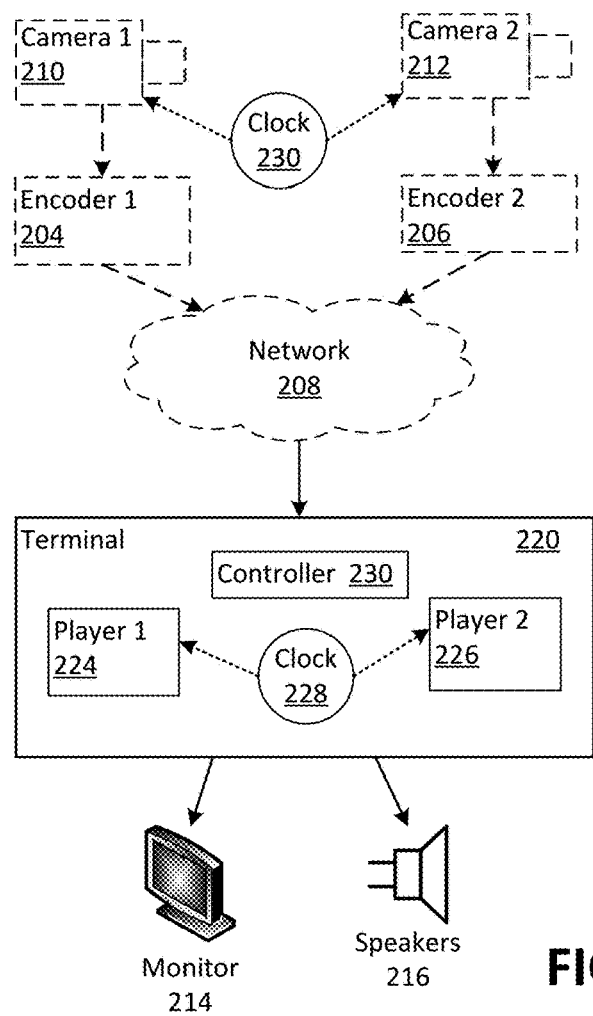
FIG. 2 is a simplified block diagram of an example media delivery system.

FIG. 2 is a simplified block diagram of an example media delivery system 200. A terminal 220, such as the terminal 120 of FIG. 1, may be connected to network 208, monitor 214, and speakers 216. Terminal 220 may comprise a media player 1 and a media player 2 as elements 224 and 226, a playback clock 228, and a controller 230. Media delivery system 200 may also include optional elements such as cameras 210, 212 connected to encoders 204, 206 and a shared encoder clock 230, and the encoders 204, 206 may be connected to network 208.

Cameras 210, 212 may capture images and audio which may then be encoded by encoders 204, 206. The encoded video may include encoding time stamps from shared encoding clock 230, which may be, for example, a wall clock. The encoded video may be sent over network 208 as separate media streams, one stream per encoder, for example using the HLS protocol.. Terminal 220 may receive two streams of media, such as audio and/or video images, from network 208. A first media stream may be decoded for playback by player 1 224 and a second media stream may be decoded for playback by player 2 226. The first stream may originate by capture at camera 1, encoding at encoder 1, and transmission through network 208 to terminal 220. The second stream may originate by capture at camera 2, encoding at encoder 2, and transmission through network 208 to terminal 220. Playback by player 1 or 2 may include rendering images on monitor 214 and rendering audio on speakers 216. Controller 230 may control player 1 and player 2 for playback of the first and second media streams, and controller may further interact with encoder 1 and encoder 2 via network 208 to discover, initiate, and otherwise control the streaming of the first and second stream. Players 1 and 2 may have access to clock 228, such as a computer's system or processor clock. A system clock may start counting which the terminal 220 is powered up or booted, and may continue counting up from that boot time irrespective of players starting or stopping playback of media. Players 1 and 2 may use clock 228 to regulate playback of media, such as the first and second media streams. When used to regulate media playback, clock 228 may be considered a playback clock. and controller 230 may control simultaneous playback in players 1 and 2 to synchronize playback of the first and second streams in the players 1 and 2. In some embodiments, controller 230 is software running on a computer processor. Player 1 and player 2 may also be software executing on a computer processor and in some embodiments, the software for controller 230 and the software for players 1 and 2 may execute on the same computer processor.

Each player 1 and 2 may be configured to synchronize playback of multiple tracks within that player using playback clock 228. For example player 1 may be able to playback a media stream comprising two tracks with corresponding presentation time stamps (PTSes). Player 1 may be able to synchronize playback of the two tracks using the PTSes and the playback clock 228. Player 2 may have the same capability of synchronizing playback of separate tracks contained within a single media stream that player 2 is playing back. However, players 1 and 2 may not have the ability to synchronize their playback between the two players. In embodiments of this disclosure, controller 230 may synchronize the playback of a first stream in player 1 with playback of a second stream in player 2.

A media player, such players 1 and 2 of FIG. 2, may expose control functions to a controller, such controller 230. For example, a media player may expose a SetAnchor control function and a SetRate control function. A SetRate(r) function may enable a controller to set the playback rate of a media player to rate r, where, for example, r=0 means playback stops (zero rate playback), r=1 means playback a normal forward speed, r=2 means playback a twice normal forward speed, and a negative value of r means playback in reverse direction. A SetAnchor(pt, st) function may enable a controller to coordinate playback of a media stream in a media player with clock available to the player. Parameters pt and st may specify a presentation time and a system time, respectively, for anchoring presentation time of the stream with the playback clock or system time. The anchoring function may create an association between system time presentation time and system time that will remain fixed until a SetRate or SetAnchor function is subsequently called. In some embodiment, SetRate and SetAnchor may be exposed by a player as an atomic operation that combines the two operations. For example a SetRateWithAnchor(r, pt, st) may atomically both set the playback rate to r, and anchor the presentation time pt to the system time st while preventing any delay between the two operations.

Figure 3:
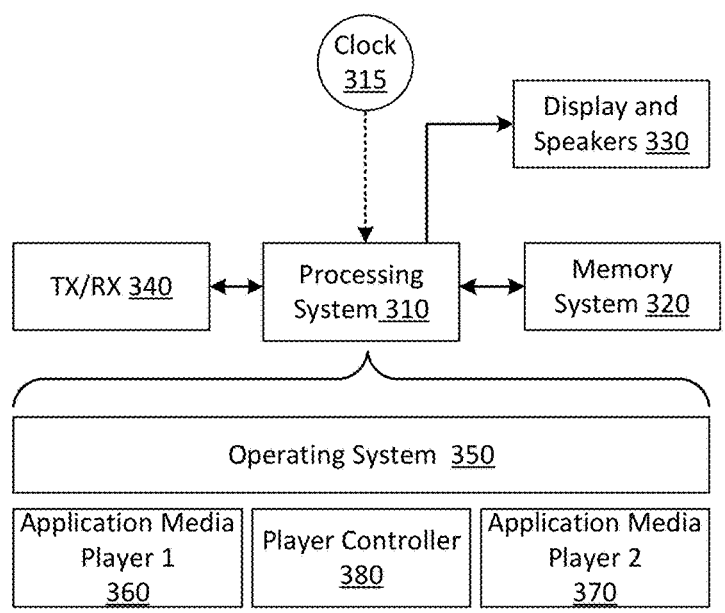
FIG. 3 is an example block diagram of a playback terminal.

FIG. 3 is an example block diagram of a playback terminal 300. Playback terminal 300 may be terminal 200 of FIG. 2, and may comprise a processing system 310, memory system 320, TX/RX 340, display and speakers 330, and a clock 315. Memory system 320 may contain instructions for execution by the processing system 310. Instructions for execution by the processing system 310 may include operating system 350, application media players 1 and 2 (elements 360 and 370), and player controller 380. Operating system 350 may be a multitasking operating system capable of running to applications simultaneously. In various embodiments, Application media players 1 and 2 and player controller 380 may be parts of a single computer application running on operating system 350, or may be separate applications simultaneously running on operating system 350.

One or more media streams may be received from a network via TX/RX 340, and may be temporarily buffered or permanently stored in memory system 320. Application media players 1 and 2 may playback the received media streams. Playback of media streams may include decoding of encoded media, and may include rendering decoded media via display and speakers 330.

Figure 4:
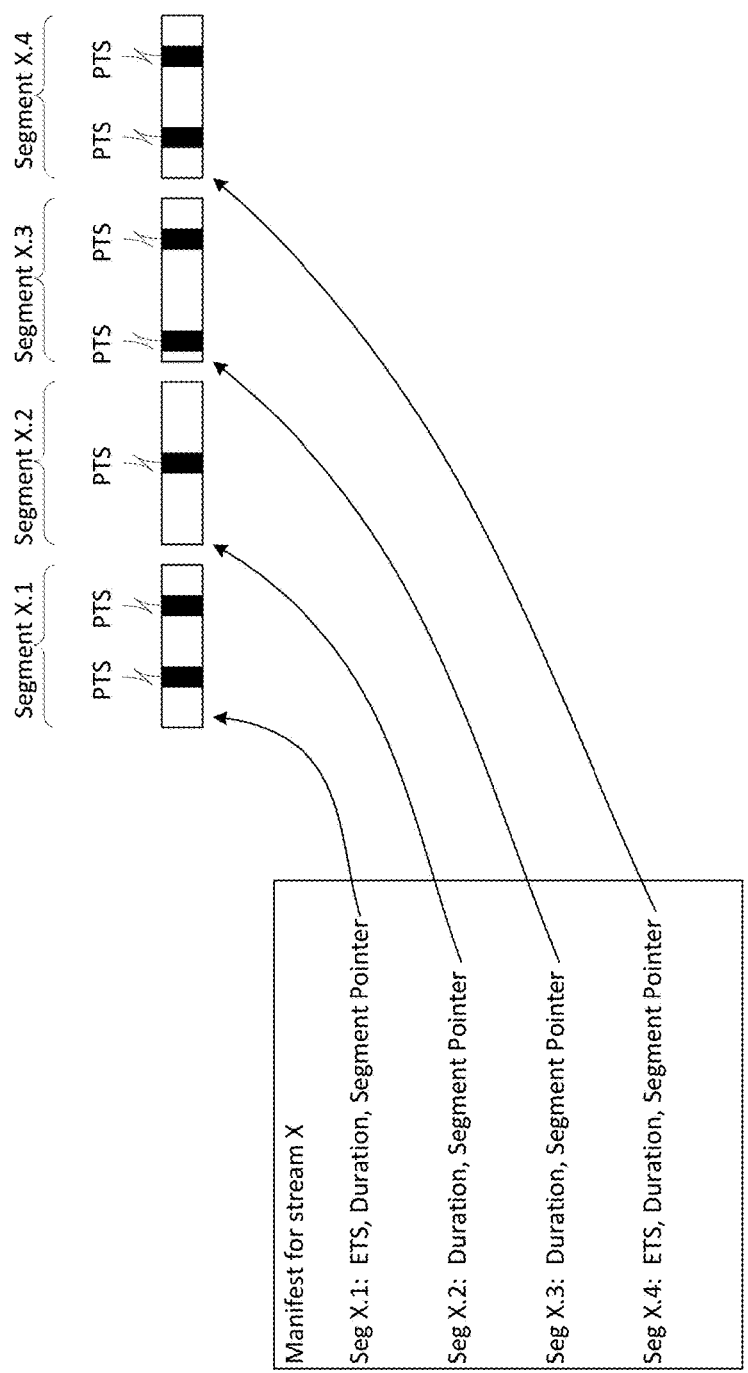
FIG. 4 depicts an example media stream with manifest and media segment files.

FIG. 4 depicts an example media stream with manifest and media segment files. A media stream, such as a HLS media stream, may include a manifest and media segments. FIG. 4 depicts a media stream X, comprising a manifest for stream X, and media segments X.1, X.1, X.3 and X.4. Each media segment X.1 to X.4 may include media data, such as compressed audio and/or video data, and may include presentation time stamps (PTSes) indicating when media data in the segment should be presented when played back. The manifest may include an entry for each of the segments X.1 to X.4. Each segment entry includes a duration and a segment pointer, and optionally includes an encoding time stamp (ETS) measured in encoding time. An ETS, for example, may be encoded in an HLS manifest entry for a media segment as a PROGRAM-DATE-TIME tag indicating a sample of an encoding wall clock that corresponds to the first PTS encoded in the media data of the corresponding media segment. Hence an ETS in a manifest may create an ETS-PTS correspondence for the media stream. A duration in a segment entry may be measured in presentation time or encoding time. A segment pointer may be information, such as a universal resource locator (URI), sufficient to identify the location of a segment file. For example, the segment entry in the manifest for segment X.1 may include a segment pointer that is a URI providing the location of file containing the actual segment X.1.

Figure 5:
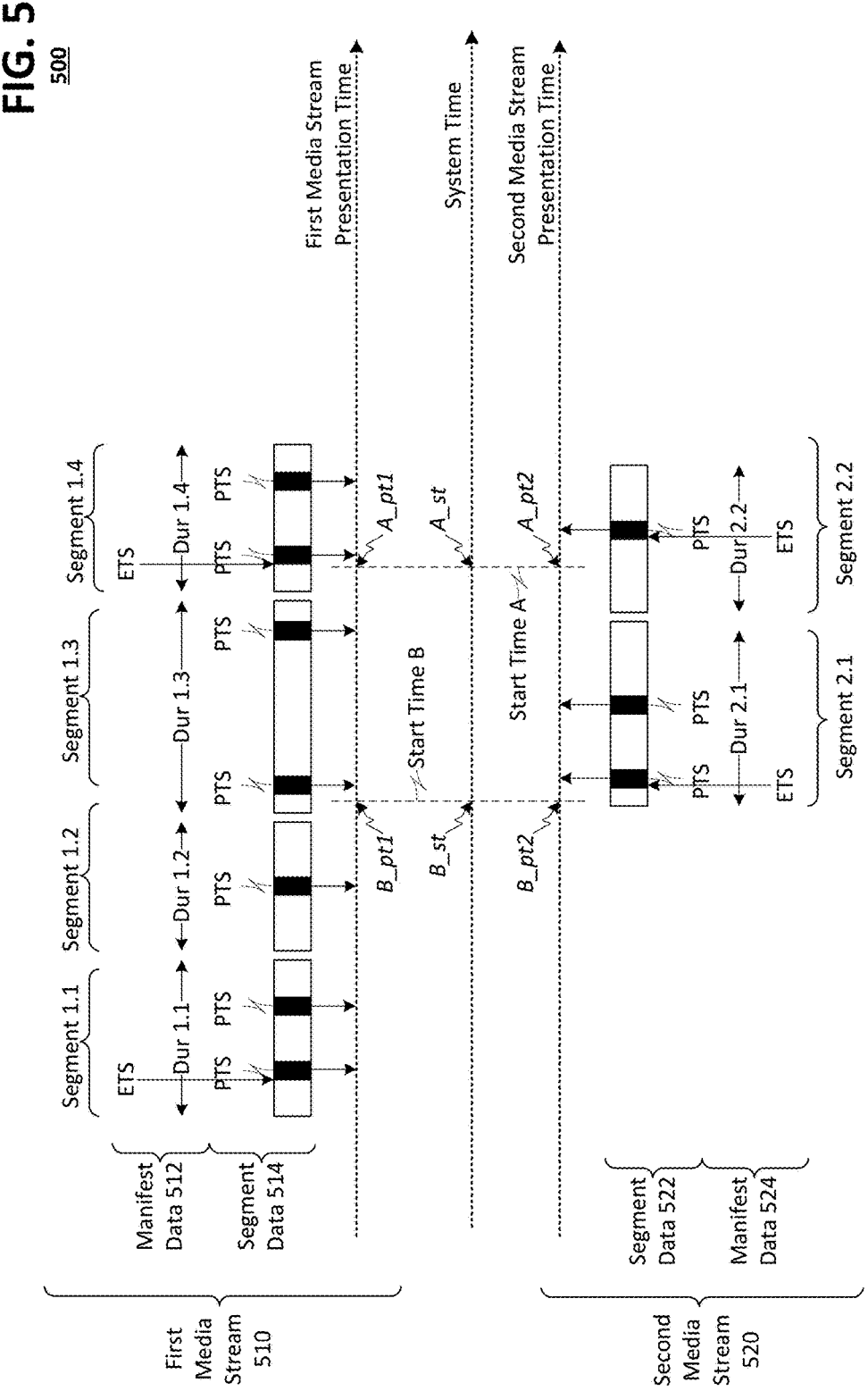
FIG. 5 is an example timing diagram with two media streams.

FIG. 5 is an example timing diagram with two media streams. A first media stream 510 comprises manifest data 512 and segment data 514. The first media stream's segment data 514 includes segment data (represented as a horizontal box) for segments 1.1 to 1.4, where each segment data may include media data such as compressed audio and video. The media data is be embedded presentation time stamps (PTSes) measured in presentation time of the first media stream. Arrows from the PTS segment data point to corresponding locations on the timeline for the first media stream presentation time. A second media stream 520 includes segment data 522 and manifest data 524. The second media stream's segment data 522 includes segment data for segments 2.1 and 2.2, where segment data may include compressed media data with embedded PTSes measured in presentation time of the second stream. Arrows from the second stream's PTS segment data point to corresponding locations on the timeline for the second media stream presentation time. Manifest data in the first and second media stream includes a duration indication of the respective media segments. For example, the manifest entry for segment 1.1 includes a duration labeled "Dur 1.1" that may indicate a playback duration time for segment 1.1. Manifest data in the first and second media stream also includes occasional encoding time stamps (ETS) for some media segments. For example, segments 1.1, 1.4, 2.1 and 2.2 all have an associated ETS, but segments 1.2 and 1.3 do not have an associated ETS. An ETS of a media segment may indicate a time stamp of the first media sample inside a media segment, whether or not the first sample has an associated PTS embedded for it in that media sample. While a media segment may have multiple embedded PTSes, every media sample in a media segment may not have an associated PTS.

To playback a single media stream, for example the first media stream 510 of FIG. 5, a start time may be chosen, for example Start Time A, indicated as a dashed vertical line in FIG. 5. To start playing the first media stream at a particular time, a controller may use a player's SetAnchor and SetRate functions. A playback device may not have a presentation clock measured in the presentation time of PTSes, but a playback device may have a system clock measured in system time. To regulate playback of a media stream, a player may correlate presentation time (used in the PTSes) with a system time (from the system clock). A controller, such as controller 230 of FIG. 2, may control how the play correlates presentation time with system time using a player's SetAnchor function For example, to start playback of the first media stream of FIG. 5 at Start Time A, a controller may set the playback time of the player to time A and then make the SetRate call with a rate of 1.0. When the media sample at A is played, it will be at some system time A_st. This establishes the correlation between the first player's presentation time and the system time. SetAnchor can also be used to synchronize playback of two media streams in separate media players, where the PTSes in each media streams do not relate to each other. For example, to synchronize playback of the first media stream 510 and the second media stream 520 of FIG. 5, a first media player, such as 360 of FIG. 3 may be initialized with the first media stream 510, for example providing player 360 with a pointer to a manifest for the first media stream 510. A second media player, such as 370 of FIG. 3, may be similarly initialized with the second media stream 520.

To synchronize playback, a start time may be chosen. To select a start time measured in encoding time, for example by selecting a start time for which the players both have access to segment data based on ETSes and segment durations. For example, a start time before the start of segment 2.1 might not be chosen because media segment data may not be available prior to the start of segment 2.1. To determine a start time that is included with both streams, a start time can be associated with encoding time, and the range of encoding times covered by a segment may start from the ETS in the manifest entry for the segment and continue until the time (ETS of the that segments+duration of that segment). If a possible start time measured in encoder time is included in the range of encoding times of a segment for both streams, then that possible start time may be selected.

A player controller, such as 380 of FIG. 3, may then correlate system time with the first stream's presentation time and the second stream's presentation time with SetAnchor. For example, to synchronize the first media stream and the second media stream at Start Time A, the controller may first use the PTS-ETS correspondence of the first media stream to determine the ETS of Start Time A. It may then use the PTS-ETS correspondence of the second media stream to determine the corresponding presentation time A_pt2 for the second media stream. It may then use the correspondence between the second media stream presentation time and the system time to determine A_st. It may then call the second player's SetAnchor function to associate A_pt2 (where A_pt2 is Start Time A measured in presentation time of the second media stream) with A_st.

As mentioned above, some media segments may not have an ETS encoded in their entry in the manifest. In these situations, an ETS may be estimate from a neighboring data segment with an ETS encoded in manifest entry and duration data for the data segments. For example, segment 1.3 of the first media stream 510 in FIG. 5 does not have an ETS. An ETS for segment 1.3 may be estimated from either the ETS of segment 1.4 or the ETS of segment 1.1. The ETS of beginning of segment 1.3 may be estimated as (the ETS of segment 1.4−duration of segment 1.3). Alternately the ETS of segment 1.3 may be estimated as (the ETS of segment 1.1+duration of segment 1.1+duration of segment 1.2). An advantage of estimating an ETS in this mannor (as compared to, for example, estimating a missing ETS based on PTSes) is that an estimate can be created with having access to the segment data itself. In this way, and ETS estimate for segment 1.3 can be created from the ETS for segment 1.1 without ever needing to access intervening media data for segment 1.2. When the distance between signaled ETSes is large (many segments do not have ETSes), significant network bandwidth or other computer resources may be saved by not needing to access the intervening media data segments.

ETS estimates may be incorrect because segment durations specified in a manifest may not be accurate. For example, HLS does not require durations in manifest entries to be accurate. However, HLS does require PTSes embedded in segment data to be accurate. So assuming an ETS encoded in a manifest is accurate, a (potentially inaccurate) ETS estimate may be corrected with PTS data. For example, after estimating an ETS for segment 1.3 with either method described above, the ETS estimate for 1.3 may be corrected using PTSes in the segment data for segment 1.3.

Figure 6:
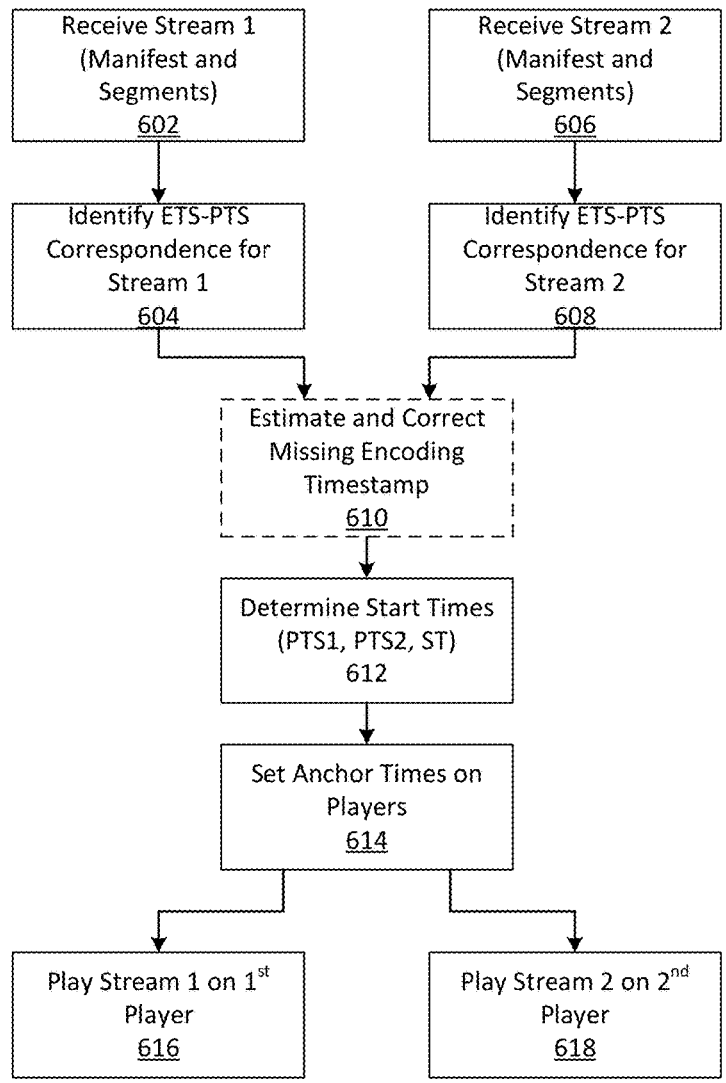
FIG. 6 is an example process for synchronizing two media streams.

FIG. 6 is an example process for synchronizing two media streams. Stream 1 and stream 2, including a manifest and some segment data, is received in boxes 602 and 606. In box 604, encoding time of stream 1 is correlated to presentation time for stream 1, for example using an ETS encoded in a manifest entry for a segment and a PTS encoded in the segment data for that same segment to identify an ETS-PTS correspondence for stream 1. In box 608, a second stream encoding time is similarly mapped to the second stream presentation time to identify an ETS-PTS correspondence for stream 2. If an ETS is missing in a manifest entry for a media data segment, then in optional box 610, an ETS may be estimated and corrected, for example using the ETS estimation and correction process of FIG. 7. In box 612, a start time can be determined in the presentation time of stream 1 (PTS1), the presentation time of stream 2 (PTS2), and in system time (ST). Using these measures of the start time, anchor times for both players can be set. For example, the player for the first stream may have an anchor time set to associate ST with PTS1, and the player for the second stream may have an anchor time set to associate ST with PTS2. In box 616, the first stream is played on the first player, and in box 618, the second stream is played on the second player. As depicted in FIG. 6, some operations, such as those of boxes 602 and 606, or boxes 616 and 618, may occur in essentially parallel. For example, to synchronize to media stream played in two separate media players, the separate players must operate in parallel.

Figure 7:
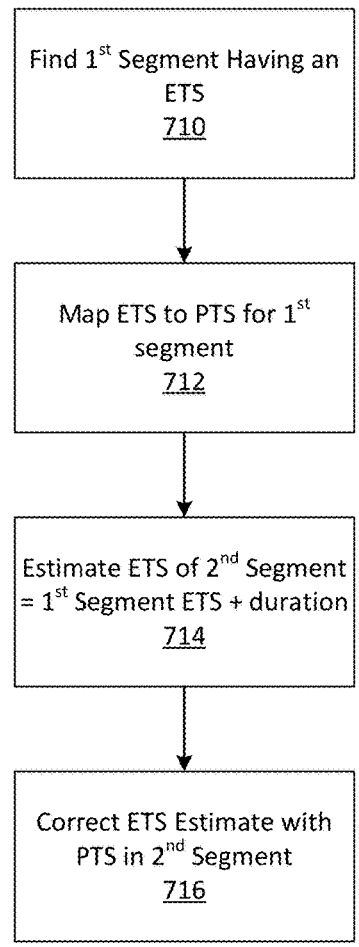
FIG. 7 is an example process for estimating and correcting encoding timestamps.

FIG. 7 is an example process for estimating and correcting encoding timestamps. In box 710, a first segment with an ETS is found, for example an segment with a manifest entry containing an ETS. In box 712, that ETS is mapped to presentation time using PTS data embedded in the segment data of the first segment. In box 714, an ETS of a second segment is estimated from the first segment's ETS and duration data of any intervening segments (for example, as explained above regarding FIG. 5). In box 716, the ETS estimate for the second segment can be corrected using a PTS in the segment data of the second segment.

As discussed above, FIGS. 1 and 2 illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs executed by a computer processor. In yet another embodiment, the terminals may be hybrid systems involving both hardware circuit systems and software programs. Moreover, not all of the functional blocks described herein need be provided or need be provided as separate units. For example, although FIG. 2 illustrates the components of an exemplary encoder, including components such player 1 (element 224) and player 2 (element 226), as separate units. In one or more embodiments, some components may be integrated. Such implementation details are immaterial to the operation of the present invention unless otherwise noted above. Similarly, the encoding, decoding, and post-processing operations described with relation to FIGS. 6 and 7 may be performed continuously as data is input into the encoder/decoder. The order of the steps as described above does not limit the order of operations.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components, or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method for presenting media, comprising:
    receiving a live first media stream including segments of first encoded data having presentation timestamps in a first presentation time, and a first manifest having a first encoding timestamp for a media sample encoded in a first segment of first encoded data;
    receiving a live second media stream including segments of second encoded data with presentation timestamps in a second presentation time, where first presentation time and second presentation time are derived from different clocks, and a second manifest having a second encoding timestamp for a media sample encoded in a second segment of second encoded data;
    determining a first correspondence between the first encoding timestamp and the first presentation timestamps;
    determining a second correspondence between the second encoding timestamp and the second presentation timestamps; and
    synchronizing a first player for the first stream and a second player for the second stream based on the determining of the first correspondence, the determining of the second correspondence, the first and second encoding timestamp, and a playback clock available to both first and second players.

2. The method of claim 1, wherein synchronizing the first and second players includes:
    determining a first start time of the first media stream in the first presentation time and a corresponding second start time of the second media stream in second presentation time;
    setting a first presentation anchor time for the first player based on first start time and the first correspondence;
    setting a second presentation anchor time for the second player based on the second start time and the second correspondence.

3. The method of claim 2, wherein synchronizing the first and second players further includes:
    presenting the first stream according to the presentation clock and the first anchor time; and
    presenting the second stream according to the presentation clock and the second anchor time.

4. The method of claim 2, wherein setting the first presentation anchor time for the first player is done atomically along with setting a rate on the first player.

5. The method of claim 1, wherein the second manifest includes indications of the duration of the segments of second encoded data, and includes references to at least one segment of the second encoded data without a corresponding encoding timestamp, and further comprising:
estimating a encoding timestamp for the at least one segment based on the second encoding timestamp and an indication of the duration an intervening segment;
correcting the estimated encoding timestamps based on presentation timestamps in the at least one segment and presentation timestamps in the second segment of second encoded data.

6. The method of claim 1, wherein the first player and the second player are separate instances of software components running on a single computing device, and the playback clock is a system clock of the single computing device.

7. The method of claim 1, wherein the first player and the second player are separate computing devices, and the playback clock is a network clock available to both separate computing devices.

8. The method of claim 1, wherein the first encoding timestamp and the second
encoding timestamp are derived from the same clock.

9. A system for presenting media, comprising:
a first media player for playing a first media stream including
segments of first encoded data having presentation timestamps in a first presentation time, and
a first manifest having a first encoding timestamp for a media sample encoded in a first segment of first encoded data;
a second media player for playing a second media stream including
segments of second encoded data with presentation timestamps in a second presentation time, where first presentation time and second presentation time are derived from different clocks, and
a second manifest having a second encoding timestamp for a media sample encoded in a second segment of second encoded data;
a playback clock available to the first and second media players; and
a controller configured to:
determine a first correspondence between the first encoding timestamp and the first presentation timestamps;
determine a second correspondence between the second encoding timestamp and the second presentation timestamps; and
synchronize the first player for the first stream and the second player for the second stream based on the determining of the first correspondence, the determining of the second correspondence, the first and second encoding timestamp, and the playback clock.

10. The system of claim 9, wherein synchronizing the first and second players includes:
determining a first start time of the first media stream in the first presentation time and a corresponding second start time of the second media stream in second presentation time;
setting a first presentation anchor time for the first player based on first start time and the first correspondence;
setting a second presentation anchor time for the second player based on the second start time and the second correspondence.

11. The system of claim 10, wherein synchronizing the first and second players further includes:

presenting the first stream according to the presentation clock and the first anchor time; and
presenting the second stream according to the presentation clock and the second anchor time.

12. The system of claim 10, wherein setting the first presentation anchor time for the first player is done atomically along with setting a rate on the first player.

13. The system of claim 9, wherein the second manifest includes indications of the duration of the segments of second encoded data, and includes references to at least one segment of the second encoded data without a corresponding encoding timestamp, and further comprising:
estimating a encoding timestamp for the at least one segment based on the second encoding timestamp and an indication of the duration an intervening segment;
correcting the estimated encoding timestamps based on presentation timestamps in the at least one segment and presentation timestamps in the second segment of second encoded data.

14. The system of claim 9, wherein the first player and the second player are separate instances of software components running on a single computing device, and the playback clock is a system clock of the single computing device.

15. The system of claim 9, wherein the first player and the second player are separate computing devices, and the playback clock is a network clock available to both separate computing devices.

16. A non-transitory computer readable media containing instructions that, when executed by a processor, cause at least:
receiving a live first media stream including segments of first encoded data having presentation timestamps in a first presentation time, and a first manifest having a first encoding timestamp for a media sample encoded in a first segment of first encoded data;
receiving a live second media stream including segments of second encoded data with presentation timestamps in a second presentation time, where first presentation time and second presentation time are derived from different clocks, and a second manifest having a second encoding timestamp for a media sample encoded in a second segment of second encoded data;
determining a first correspondence between the first encoding timestamp and the first presentation timestamps;
determining a second correspondence between the second encoding timestamp and the second presentation timestamps; and
synchronizing a first player for the first stream and a second player for the second stream based on the determining of the first correspondence, the determining of the second correspondence, the first and second encoding timestamp, and a playback clock available to both first and second players.

17. The non-transitory computer readable media of claim 16, wherein synchronizing the first and second players includes:
determining a first start time of the first media stream in the first presentation time and a corresponding second start time of the second media stream in second presentation time;
setting a first presentation anchor time for the first player based on first start time and the first correspondence;
setting a second presentation anchor time for the second player based on the second start time and the second correspondence.

18. The non-transitory computer readable media of claim 17, wherein synchronizing the first and second players further includes:
  presenting the first stream according to the presentation clock and the first anchor time; and
  presenting the second stream according to the presentation clock and the second anchor time.

19. The non-transitory computer readable media of claim 17, wherein setting the first presentation anchor time for the first player is done atomically along with setting a rate on the first player.

20. The non-transitory computer readable media of claim 16, wherein the second manifest includes indications of the duration of the segments of second encoded data, and includes references to at least one segment of the second encoded data without a corresponding encoding timestamp, and further comprising:
  estimating a encoding timestamp for the at least one segment based on the second encoding timestamp and an indication of the duration an intervening segment;
  correcting the estimated encoding timestamps based on presentation timestamps in the at least one segment and presentation timestamps in the second segment of second encoded data.

21. The non-transitory computer readable media of claim 16, wherein the first player and the second player are separate instances of software components running on a single computing device, and the playback clock is a system clock of the single computing device.

* * * * *